United States Patent
Yun (10) Patent No.: US 10,000,896 B2
(45) Date of Patent: Jun. 19, 2018

(54) TWO-LAYER CONCRETE PAVEMENT FORMING DEVICE AND PAVEMENT METHOD USING NORMAL CONCRETE AND HIGH-PERFORMANCE CONCRETE

(71) Applicant: KANGWON NATIONAL UNIVERSITY UNIVERSITY-INDUSTRY COOPERATION FOUNDATION, Gangwon-do (KR)

(72) Inventor: Kyong Ku Yun, Seoul (KR)

(73) Assignee: KANGWON NATIONAL UNIVERSITY UNIVERSITY-INDUSTRY COOPERATION FOUNDATION, Gangwon-do (KR)

( * ) Notice: Subject to any disclaimer, the term of this patent is extended or adjusted under 35 U.S.C. 154(b) by 0 days. days.

(21) Appl. No.: 15/103,019

(22) PCT Filed: Dec. 4, 2014

(86) PCT No.: PCT/KR2014/011807
§ 371 (c)(1),
(2) Date: Jun. 9, 2016

(87) PCT Pub. No.: WO2015/088182
PCT Pub. Date: Jun. 18, 2015

(65) Prior Publication Data
US 2016/0340840 A1    Nov. 24, 2016

(30) Foreign Application Priority Data

Dec. 10, 2013 (KR) .................. 10-2013-0153231
Dec. 23, 2013 (KR) .................. 10-2013-0161789

(51) Int. Cl.
*E01C 19/12* (2006.01)
*E01C 19/48* (2006.01)
(Continued)

(52) U.S. Cl.
CPC .......... *E01C 19/4893* (2013.01); *C04B 28/02* (2013.01); *E01C 7/14* (2013.01);
(Continued)

(58) Field of Classification Search
USPC ........................................... 404/82
See application file for complete search history.

(56) References Cited

U.S. PATENT DOCUMENTS 3,603,211 A * 9/1971 Firth .................... F01B 1/0648
91/180
3,732,791 A * 5/1973 Hohwiller ............... C04B 16/08
404/31

(Continued)

FOREIGN PATENT DOCUMENTS

CN    2630305 Y    8/2004
CN    2837367 Y    11/2006
(Continued)

OTHER PUBLICATIONS

International Search Report dated Mar. 24, 2015 for PCT/KR2014/011807.

*Primary Examiner* — Thomas B Will
*Assistant Examiner* — Katherine J Chu (57) ABSTRACT

A method for reinforcing an assembly-type slope by using high-performance shotcrete and a reinforcing member, the method, after producing, at a batch plant, normal concrete having a compressive strength of 21-30 MPa and transporting the normal concrete to a construction site: forms a normal-strength shotcrete by mixing either fly ash or slag fine powder or low-grade mixed material in which fly ash or (Continued)

slag fine powder is mixed, in an increased fluidity state by mixing 20-40% of bubbles of the total volume; forms a high-performance shotcrete by mixing silica fumes and metakaolin or high-grade mixed material in which either silica fumes or metakaolin are mixed; and forms a color shotcrete by mixing coloring materials of iron oxide or carbon black, so as to sequentially construct an inner layer section, an outer layer section, and a surface layer section on the slope.

10 Claims, 9 Drawing Sheets

(51) Int. Cl.
<table>
<tr><td>E01C 7/14</td><td>(2006.01)</td></tr>
<tr><td>C04B 28/02</td><td>(2006.01)</td></tr>
<tr><td>E01C 19/30</td><td>(2006.01)</td></tr>
<tr><td>E01C 19/00</td><td>(2006.01)</td></tr>
<tr><td>E01C 19/42</td><td>(2006.01)</td></tr>
<tr><td>E04G 21/04</td><td>(2006.01)</td></tr>
<tr><td>C04B 111/00</td><td>(2006.01)</td></tr>
</table>

(52) U.S. Cl.
CPC ............ *E01C 19/002* (2013.01); *E01C 19/30* (2013.01); *E01C 19/42* (2013.01); *E01C 19/486* (2013.01); *E01C 19/4833* (2013.01); *E01C 19/4853* (2013.01); *C04B 2111/00612* (2013.01); *E04G 2021/049* (2013.01); *Y02A 30/68* (2018.01); *Y02W 30/92* (2015.05); *Y02W 30/94* (2015.05)

(56) References Cited

U.S. PATENT DOCUMENTS

| | | | | |
|---|---|---|---|---|
| 4,073,592 A * | 2/1978 | Godberson | ........... | E01C 19/407 404/105 |
| 4,148,938 A * | 4/1979 | Hansen | ................... | C09K 3/18 106/13 |
| 4,210,457 A * | 7/1980 | Dodson | ................... | C04B 28/04 106/459 |
| 4,708,288 A * | 11/1987 | von Eckardstein | ... | E21D 11/105 239/10 |
| 5,452,856 A * | 9/1995 | Pritchard | ................... | B05B 7/08 239/297 |
| 5,654,352 A * | 8/1997 | MacDonald | ............ | C04B 28/02 524/17 |
| 5,979,798 A * | 11/1999 | Hall | ........................ | B05B 7/149 239/400 |
| 6,068,025 A * | 5/2000 | Schlecht | .................. | E04G 21/04 138/109 |
| 6,915,966 B2 * | 7/2005 | Gist | ........................ | B01F 5/08 239/290 |
| 7,854,397 B2 * | 12/2010 | Colavito | ............... | B05B 7/1436 239/290 |
| 8,408,781 B2 * | 4/2013 | Welker | ................ | B01F 3/04439 366/10 |
| 9,382,156 B2 * | 7/2016 | Ren | ......................... | C04B 28/02 |
| 2004/0149170 A1 * | 8/2004 | Moran | .................... | B28C 5/381 106/672 |
| 2006/0204334 A1 * | 9/2006 | Guntert, Jr. | ........... | E01C 19/185 404/101 |
| 2007/0116517 A1 * | 5/2007 | Sapozhnikov | .......... | E01C 3/003 404/17 |
| 2009/0075073 A1 * | 3/2009 | Biddle | .................... | C04B 28/02 428/339 |
| 2010/0246312 A1 * | 9/2010 | Welker | ................ | B01F 3/04439 366/4 |
| 2010/0286312 A1 * | 11/2010 | Zhang | ................... | C04B 18/084 524/4 |
| 2012/0189388 A1 * | 7/2012 | O'Connell | ................. | C08J 9/30 404/82 |
| 2013/0087075 A1 * | 4/2013 | Massa | ..................... | C04B 28/18 106/672 |
| 2013/0152855 A1 * | 6/2013 | Hartman | ............... | B05C 17/015 118/300 |
| 2014/0029371 A1 * | 1/2014 | Falco | .................... | B01F 5/0473 366/10 |
| 2014/0221534 A1 * | 8/2014 | Osborne, Jr. | ........... | C04B 28/04 524/3 |
| 2015/0122153 A1 * | 5/2015 | Warner | ................... | C04B 28/32 106/675 |
| 2016/0151933 A1 * | 6/2016 | Yun | ........................ | B28C 5/381 366/3 |

FOREIGN PATENT DOCUMENTS

| | | |
|---|---|---|
| CN | 101100839 A | 1/2008 |
| KR | 10-2000-0055032 | 9/2000 |
| KR | 10-0336526 | 11/2002 |
| KR | 10-2007-0095661 | 10/2007 |
| KR | 10-2009-0087742 | 8/2009 |
| KR | 10-0920025 | 10/2009 |

* cited by examiner

TWO-LAYER CONCRETE PAVEMENT FORMING DEVICE AND PAVEMENT METHOD USING NORMAL CONCRETE AND HIGH-PERFORMANCE CONCRETE

This application claims the priority of Korean Patent Application Nos. 10-2013-0153231 and 10-2013-0161789, filed on Dec. 10, 2013 and Dec. 23, 2013in the KIPO (Korean Intellectual Property Office), the disclosure of which is incorporated herein entirely by reference. Further, this application is the National Stage application of International Application No. PCT/KR2014/011807, filed Dec. 4, 2014, which designates the United States and was published in Korean. Each of these applications is hereby incorporated by reference in their entirety into the present application.

TECHNICAL FIELD

The present disclosure relates to a two-layer concrete pavement device and pavement method, and more particularly, to a two-layer concrete pavement device and pavement method using normal concrete and high-performance concrete, in which a lower layer of a two-layer concrete pavement is formed with normal concrete produced at a single batcher plant, and an upper layer of the two-layer concrete pavement with a smaller thickness than the lower layer of the two-layer concrete pavement is formed on an upper surface of the lower layer of the two-layer concrete pavement with high-performance concrete formed by mixing the normal concrete with bubble slurry.

BACKGROUND ART

Generally, for concrete pavement, normal concrete having a slump of 40 mm below is produced at a batcher plant, carried to a construction site using a dump truck, and then placed using a slip form paver. A jointed concrete pavement having joints formed on a pavement surface of the concrete pavement at regular intervals is constructed with a design life of 20 years, but its service performance may rapidly deteriorate since various damages such as joint spalling cracks, surface detachment or the like occur in early stage.

In order to prevent early damage of the concrete pavement and ensure long-term public service, in Europe or the like, two-layer concrete pavement has been developed and applied. In other words, a lower layer of the two-layer concrete pavement is made of normal concrete for economic feasibility, and an upper layer is formed on an upper surface thereof with high-performance concrete for durability. In this construction technique, however, two batcher plants should be operated to supply two kinds of concretes simultaneously for two-layer placing, which is a difficult work and may increase construction costs.

As a technique for maintaining high strength while improving durability, Korean Unexamined Patent Publication No. 10-2007-0095661 discloses a hybrid road pavement material and a road pavement method.

In this technique, an open graded asphalt pavement is formed, then cement slurry is injected from the surface of the open graded asphalt pavement to form a semi-rigid pavement layer in a lower region of the open graded asphalt pavement, and a resin composition is injected from the surface of the open graded asphalt pavement to form a resin pavement layer at an upper portion of the semi-rigid pavement layer.

However, in this technique, a process of forming a resin penetration layer between the semi-rigid pavement and the resin pavement layer is complicated, which results in extension of construction and curing times and increased construction costs.

DISCLOSURE OF THE INVENTION

Technical Problem

The present disclosure is designed to solve the above problems, and the present disclosure is directed to providing a two-layer concrete pavement device and pavement method using normal concrete and high-performance concrete, in which a lower layer of a two-layer concrete pavement is formed with normal concrete in which water, cement and aggregate are mixed, and an upper layer of the two-layer concrete pavement with a smaller thickness than the lower layer of the two-layer concrete pavement is formed on an upper surface of the lower layer of the two-layer concrete pavement with high-performance concrete formed by mixing the normal concrete with bubble slurry in which bubbles and a mixed material are mixed.

The present disclosure is also directed to providing a two-layer concrete pavement device and pavement method using normal concrete and high-performance concrete, in which a lower layer of a two-layer concrete pavement is formed with normal concrete produced at a single batcher plant, and an upper layer of the two-layer concrete pavement is formed with high-performance concrete which may be easily prepared by mixing the normal concrete with bubble slurry in which bubbles and a mixed material are mixed, thereby ensuring improved construction and life extension, which results in improved economic feasibility.

Technical Solution

In one general aspect, the present disclosure provides a two-layer concrete pavement device using normal concrete and high-performance concrete, comprising:

an usual slip form paver configured to form a lower layer of a two-layer concrete pavement by using a normal concrete with a slump of 40 mm or below;

a high-performance concrete forming unit provided at one side of the slip form paver to form high-performance concrete by mixing the normal concrete with bubble slurry in which bubbles and a mixed material are mixed;

a high-performance concrete discharging unit configured to discharge the high-performance concrete to an upper surface of the lower layer of the two-layer concrete pavement, while dissipating the bubbles included in the high-performance concrete, to form an upper layer of the two-layer concrete pavement; and a vibrating worktable installed at the slip form paver to tamp and finish an upper surface of the upper layer of the two-layer concrete pavement.

In another aspect, the present disclosure provides a two-layer concrete pavement method using normal concrete and high-performance concrete, comprising:

forming a lower layer of a two-layer concrete pavement by pressing a normal concrete with a slump of 40 mm or below using a slip form paver;

forming high-performance concrete by mixing the normal concrete with bubble slurry in which bubbles and a mixed material are mixed;

discharging the high-performance concrete to an upper surface of the lower layer of the two-layer concrete pavement in a smaller thickness than the lower layer of the two-layer concrete pavement, while dissipating the bubbles included in the high-performance concrete, to form an upper layer of the two-layer concrete pavement; and tamping and finishing an upper surface of the upper layer of the two-layer concrete pavement by using a vibrating worktable.

Advantageous Effects

According to the present disclosure, a lower layer of a two-layer concrete pavement is formed with normal concrete in which water, cement and aggregate are mixed, and an upper layer of the two-layer concrete pavement with a smaller thickness than the lower layer of the two-layer concrete pavement is formed on an upper surface of the lower layer of the two-layer concrete pavement with high-performance concrete formed by mixing the normal concrete with bubble slurry. Thus, a time required for curing the two-layer concrete pavement is shortened, which ensures improved construction, and the high-performance concrete allows high strength and high durability to be kept, which extends a life span of the two-layer concrete pavement and improves economic feasibility.

<Detailed Description of Main Elements>

| | |
|---|---|
| 100: pavement device | 110: slip form paver |
| 120: high-performance concrete forming unit | 130: high-performance concrete discharging unit |
| 140: vibrating worktable | |

MODE FOR CARRYING OUT THE INVENTION

Figure 1:
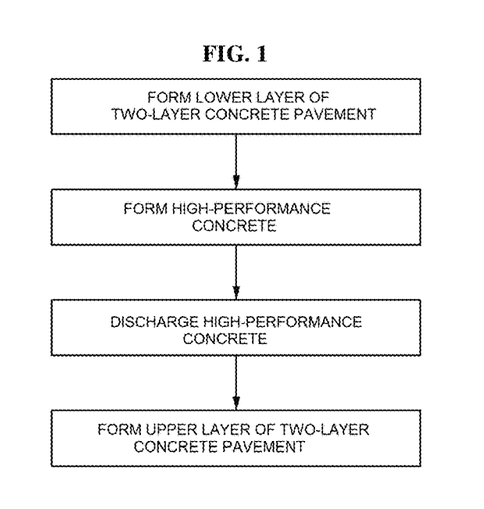
FIG. 1 is a flowchart of the present disclosure.
Figure 2:
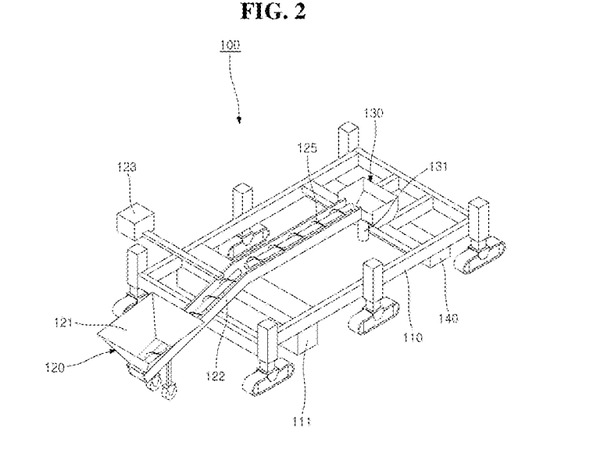
FIGS. 2 and 3 are schematic diagrams of the present disclosure.
Figure 3:
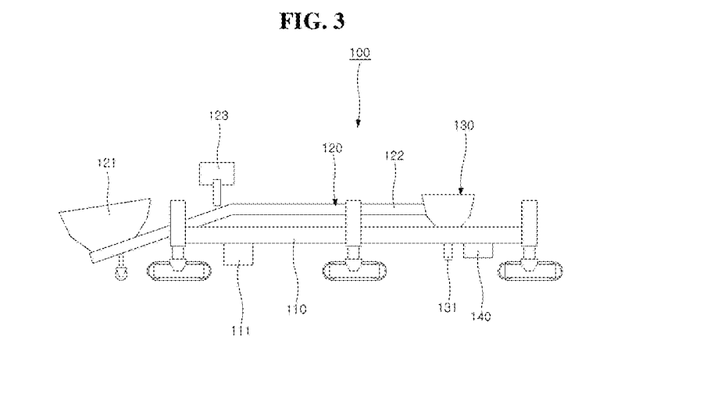

Hereinafter, the present disclosure will be described in detail with reference to accompanying drawings. FIG. 1 is a flowchart of the present disclosure, and FIGS. 2 and 3 are schematic diagrams of the present disclosure.

A two-layer concrete pavement device 100 using normal concrete and high-performance concrete according to the present disclosure includes a slip form paver 110 configured to form a lower layer 51 of a two-layer concrete pavement 50 by using a normal concrete with a slump of 40 mm or below, a high-performance concrete forming unit 120 provided at one side of the slip form paver 110 to form high-performance concrete by mixing the normal concrete with bubble slurry 123 in which bubbles and a mixed material are mixed, a high-performance concrete discharging unit 130 configured to discharge the high-performance concrete to an upper surface of the lower layer 51 of the two-layer concrete pavement 50, while dissipating the bubbles included in the high-performance concrete, to form an upper layer 52 of the two-layer concrete pavement 50, and a vibrating worktable 140 installed at the slip form paver 110 to tamp and finish an upper surface of the upper layer 52 of the two-layer concrete pavement 50. This will be described later in more detail.

The high-performance concrete forming unit 120 includes a hopper 121 configured to supply the normal concrete to a front end of the slip form paver 110, a connection member 122 configured to connect the hopper 121 to the high-performance concrete discharging unit 130 and guide movement of the normal concrete supplied to the hopper 121, bubble slurry 123 mixed with the normal concrete to increase a slump of the normal concrete moved to the connection member 122, and a screw 125 configured to mix the normal concrete with the bubble slurry 123 to form high-performance concrete 124.

Figure 9:
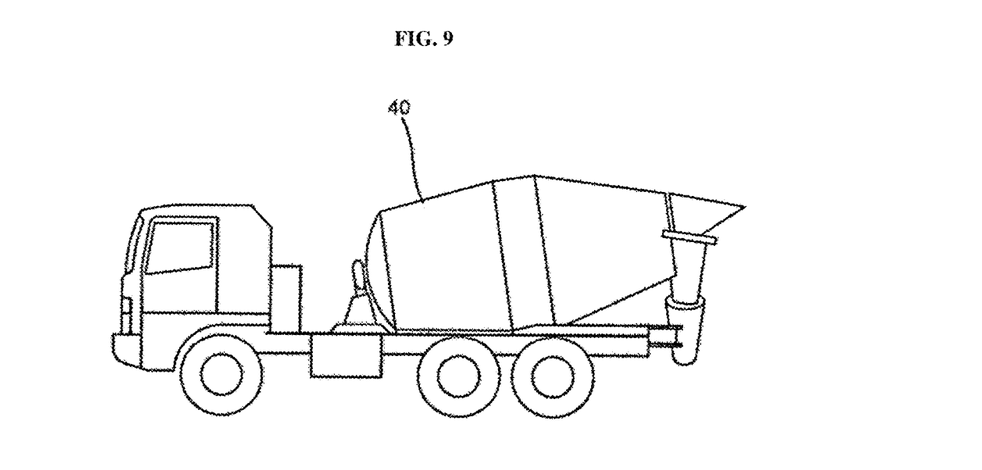
FIGS. 9 and 10 are diagrams showing a high-performance concrete forming unit according to another embodiment of the present disclosure.
Figure 10:
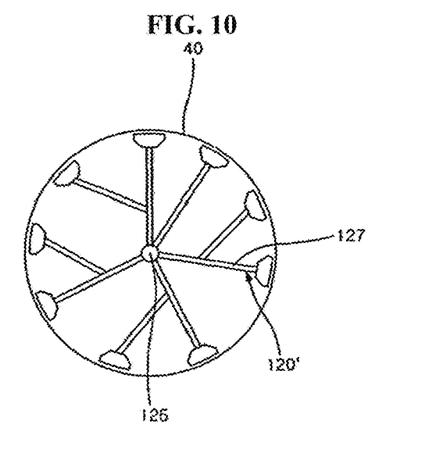

The high-performance concrete forming unit 120' includes a shaft 126 configured to rotate by means of a power of a motor in a concrete mixer truck 40 to which the normal concrete is put, and a mixing member 127 formed at the shaft 126 to have at least one stage in a radial direction to mix the normal concrete with the bubble slurry 123 while rotating in a rotation direction of the shaft 126.

The mixed material may be obtained by mixing at least one of silica fume, metakaolin, fly ash, blast furnace slag fine powder, latex, polymer and coloring.

Figure 16:
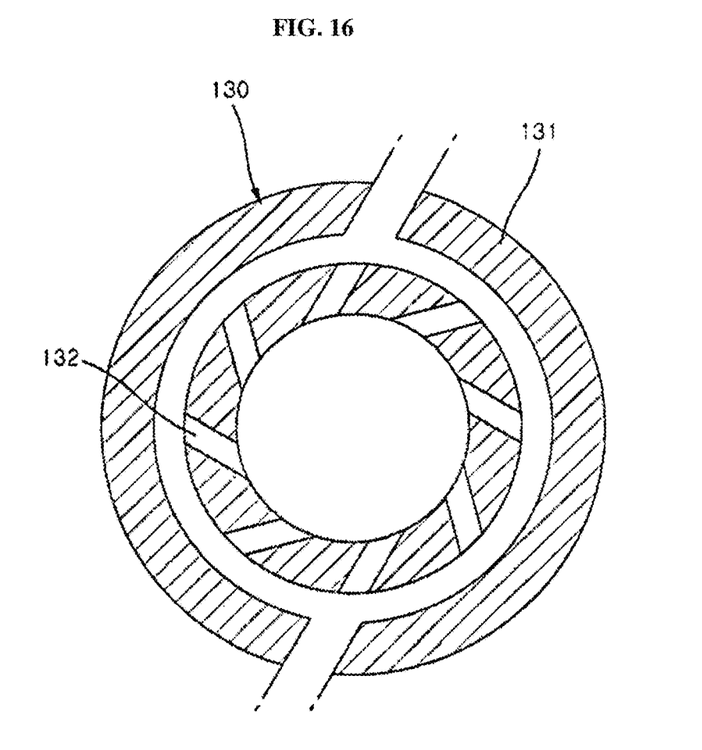
FIG. 16 is a cross-sectional view showing a high-performance concrete discharging unit of the present disclosure.

The high-performance concrete discharging unit 130 includes a discharge guide member 131 configured to receive the high-performance concrete and discharge the high-performance concrete to the upper surface of the lower layer, and an air supply hole 132 formed through the discharge guide member 131 to reduce an air volume by dissipating bubbles included in the high-performance concrete 124 supplied to the discharge guide member 131 so as to supply a high-pressure air of 5 atmospheres or above.

The vibrating worktable 140 may be formed integrally with the usual slip form paver 110 or formed integrally with the usual slip form paver 110'.

Now, an operating process of the present disclosure configured as above will be described.

Figure 4:
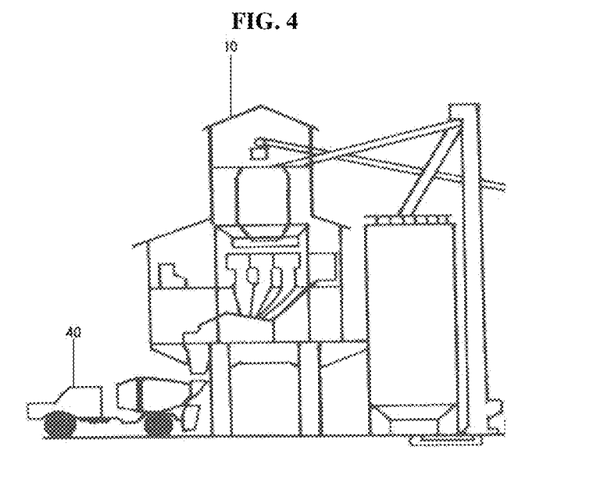
FIG. 4 is a diagram showing that normal concrete is formed according to the present disclosure.

First, as shown in FIG. 4, water, cement, aggregate or the like respectively supplied from a batcher plant 10 are mixed and blended at a suitable ratio to form normal concrete having a slump of 40 mm or below, and then the normal concrete is carried to a construction site of a two-layer concrete pavement 50 by means of a dump truck.

Figure 5:
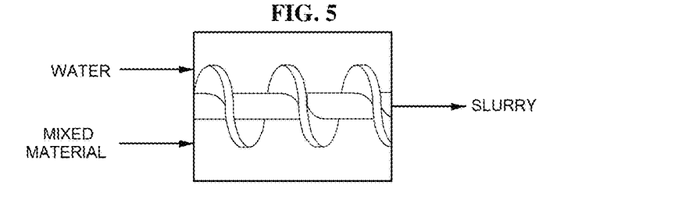
FIG. 5 is a diagram showing that slurry is formed according to the present disclosure.
Figure 6:
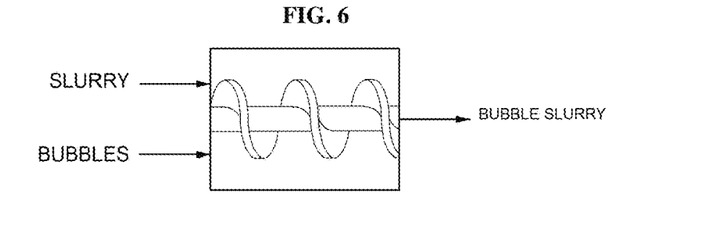
FIG. 6 is a diagram showing that bubble slurry is formed according to the present disclosure.

In addition, as shown in FIGS. 5 and 6, water and a mixed material obtained by mixing at least one of silica fume, metakaolin, fly ash, blast furnace slag fine powder, latex, polymer and coloring are mixed at a ratio of 1:1 using a mixing device such as a screw to produce slurry, and the produced slurry is mixed with bubbles produced by a bubble agent or a bubble generator using a mixing device such as a vertically stirring screw to form bubble slurry and then is put into the normal concrete to be mixed with the normal concrete.

The bubble slurry may be mixed with the slurry in which water and a mixed material are mixed, at a ratio of 1 kg of bubble slurry: 8 to 10 L of bubbles, but the mixture ration may be set in consideration of the strength and slump of the high-performance concrete 124. Here, if producing bubble slurry is produced using the mixing device such as a vertically stirring screw, separation of materials caused by different weights of the slurry and the bubbles may be prevented, and a horizontally rotating stirrer is inappropriate since bubbles of the bubble slurry are too light.

The high-performance concrete 124 means concrete having high strength and high durability in comparison to the normal concrete. Here, the high strength means strength of 35 MPa or above, and the high durability means freezing-thawing resistance of 90% or above.

Figure 7:
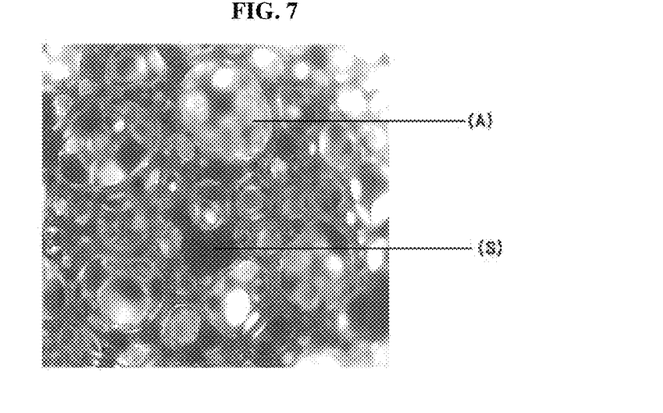
FIG. 7 is an enlarged photograph showing the bubble slurry of the present disclosure.

FIG. 7 shows an enlarged view showing the bubble slurry mixed by the mixing device. Here, it may be found that bubbles (A) included in the bubble slurry have a size of about 0.1 to 1 mm, and silica fume (S) serving as the mixed material is regularly scattered and dispersed among the bubbles (A).

Here, in the mixed material, silica fume may be mixed by the content of 5 to 15 parts by weight on the basis of 100 parts by weight of concrete of the normal concrete. Also, metakaolin may be mixed by the content of 7 to 20 parts by weight on the basis of 100 parts by weight of concrete of the normal concrete. In addition, fly ash and blast furnace slag powder may be mixed by the content of 15 to 25 parts by weight on the basis of 100 parts by weight of concrete of the normal concrete. Moreover, latex and polymer may be mixed by the content of 3 to 15 parts by weight on the basis of 100 parts by weight of concrete of the normal concrete. If the content is smaller than the above ranges, high strength and high durability may be deteriorated. If the content is greater than the above ranges, construction costs may be increased without enhancing high strength and high durability further.

In addition, in the mixed material, coloring may be mixed by the content of 2 to 7% parts by weight on the basis of 100 parts by weight of concrete of the normal concrete. The coloring may employ iron oxide and exhibit the degree of color as much as asphalt pavement. If the content is smaller than the above range, it is impossible to exhibit the degree of color as much as asphalt pavement. If the content is greater than the above range, construction costs may be increased without enhancing the degree of color over asphalt pavement.

Figure 8:
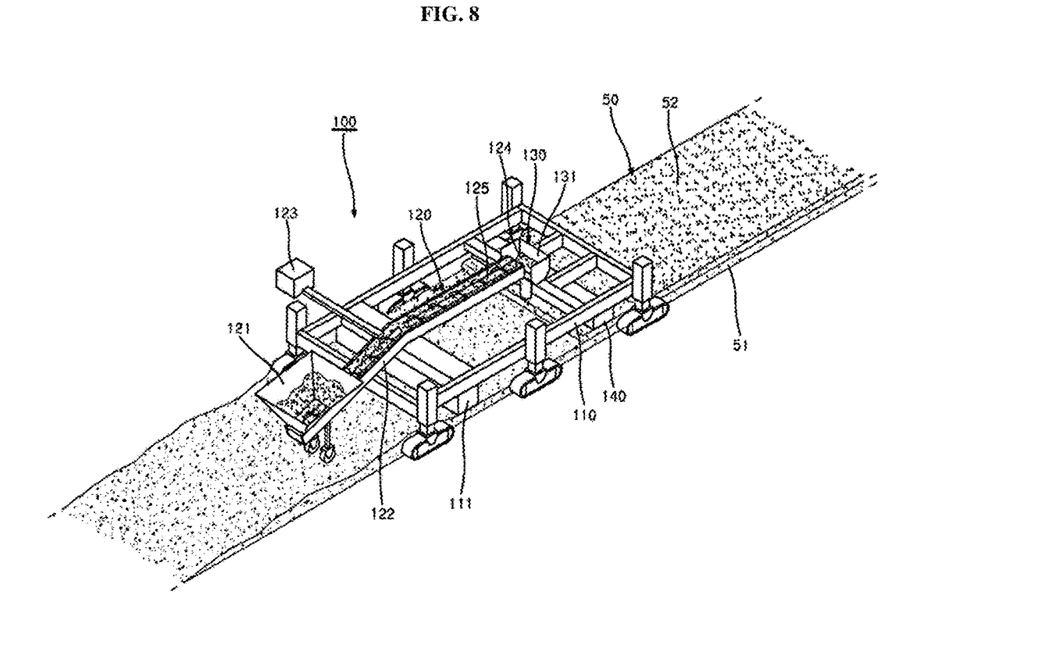
FIG. 8 is a diagram showing a construction process of the present disclosure.

Meanwhile, if the normal concrete carried to a construction site by a dump truck is put on the ground of the construction site, as shown in FIG. 8, the normal concrete forms the lower layer 51 of the two-layer concrete pavement 50 by the slip form paver 110 to have a thickness of 200 to 300 mm and a width of one or three lanes, which is flattened by a planar worktable 111.

Once the lower layer 51 of the two-layer concrete pavement 50 is formed, the remaining normal concrete is supplied to the hopper 121 of the high-performance concrete forming unit 120 and carried to the high-performance concrete discharging unit 130 along the connection member 122 due to the rotation of the screw 125. At the same time, the bubble slurry is put into the normal concrete moving along the connection member 122 and mixed with the normal concrete. Here, as a mixing ratio, 240 to 400 L of bubble slurry may be mixed per 1 m$^3$ of the normal concrete, and this means that the amount of bubbles is 20 to 40% in the normal concrete mixed with the bubble slurry.

Here, the high-performance concrete forming unit 120 is a vertically stirring mixer, which is formed with a slope so that an outlet is higher than an inlet, and thus the bubble slurry and the normal concrete may be easily mixed due to a height difference of the screw 125 to form high-performance concrete.

In addition, as shown in FIGS. 9 and 10, after the high-performance concrete forming unit 120' supplies the normal concrete and the bubble slurry to the concrete mixer truck 40, the shaft 126 rotates by means of a power of a motor in the concrete mixer truck 40, and simultaneously a plurality of mixing members 127 mounted at the shaft 126 rotate together with the shaft 126 to form high-performance concrete in which the normal concrete and the bubble slurry are mixed.

Figure 11:
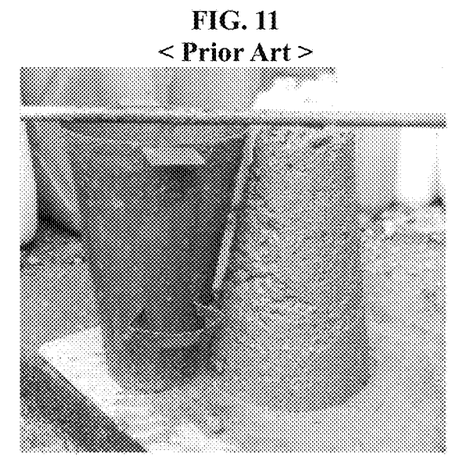
FIGS. 11 and 12 are photographs showing slump of normal concrete and high-performance concrete applied to the present disclosure.
Figure 12:
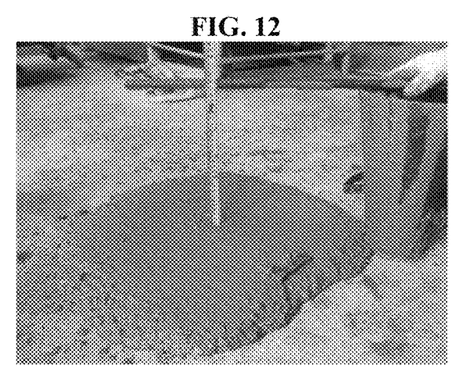

As bubbles are regularly mixed to the normal concrete due to the ball bearing effect of the bubbles, the high-performance concrete has very great fluidity due to the mixture of the bubbles. Here, FIG. 11 shows that water, cement, aggregate or the like used for the normal concrete are mixed at a standard mixing ratio broadly used in the art, at which a slump is 0 mm, but FIG. 12 shows that the high-performance concrete 124 formed by mixing the bubble slurry with the normal concrete has a greater slump of 230 mm. In other words, in FIG. 11, the air volume present in the normal concrete before the bubble slurry is mixed to the normal concrete is 3%, but in FIG. 12, it may be found that the air volume present in the high-performance concrete 124 obtained by mixing the bubble slurry with the normal concrete greatly increases to 26%.

The increased amount of air may allow the mixed material to be regularly dispersed in the normal concrete due to the ball bearing effect. However, the high-performance concrete 124 including a great amount of air may have serious deteriorated strength and durability. In general case, in a relation between the air volume included in the normal concrete and the compressive strength of the normal concrete, if the air volume in the normal concrete increases by 1%, the compressive strength decreases by about 4%. In other words, if the high-performance concrete 124 includes a great amount of air, its strength is too seriously deteriorated to be used as a structural material, and also its slump increases greatly, beyond the workable range for discharging the high-performance concrete 124.

Therefore, in order to reduce the large amount of air included in the high-performance concrete 124, an antifoaming agent is added thereto or discharged to the high-performance concrete discharging unit 130.

The antifoaming agent may be included by the content of 0.1 to 2.0 parts by weight on the basis of 100 parts by weight of the high-performance concrete 124 in order to remove the bubbles regularly dispersed in the mixed material of the high-performance concrete 124.

Figure 13:
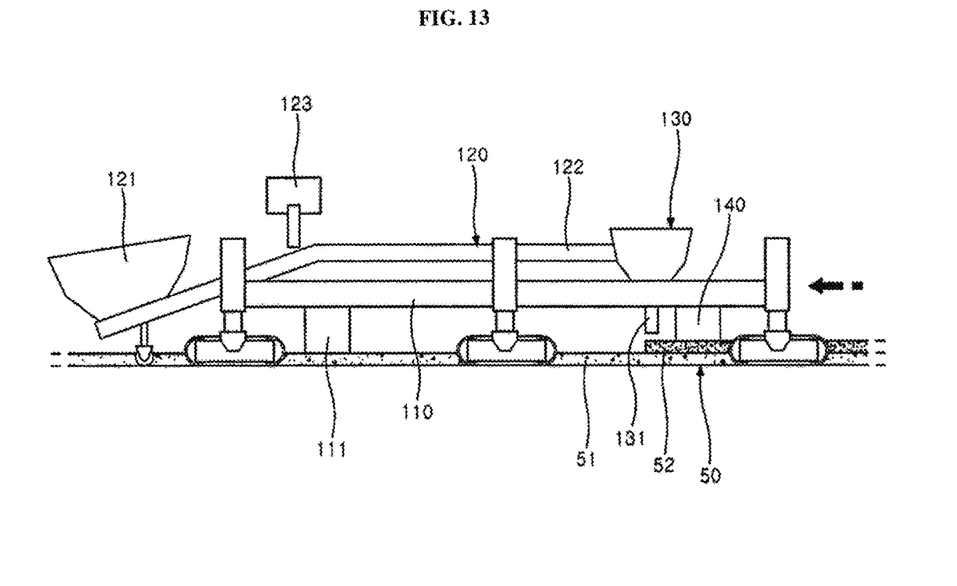
FIGS. 13 to 15 are diagrams showing a process of discharging high-performance concrete according to the present disclosure.
Figure 14:
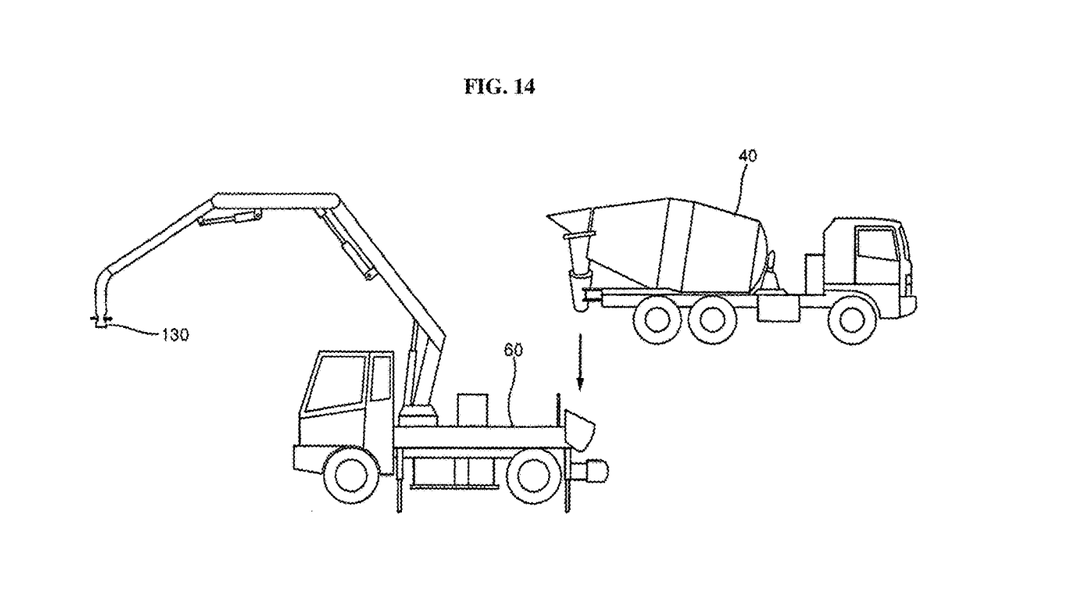

In addition, as shown in FIG. 13, the high-performance concrete 124 formed by the high-performance concrete forming unit 120 is supplied to an inlet of the discharge guide member 131 of the high-performance concrete discharging unit 130, or as shown in FIG. 14, the high-performance concrete 124 formed by the high-performance concrete forming unit 120' is supplied to the inlet of the discharge guide member 131 of the high-performance concrete discharging unit 130 via a pump car 60.

Since the discharge guide member 131 has a through hole therein and is also formed so that both ends at its inlet and outlet have a smaller diameter than its central portion, the high-performance concrete 124 discharged to the discharge guide member 131 is compressed to generate a pressure.

Figure 15:
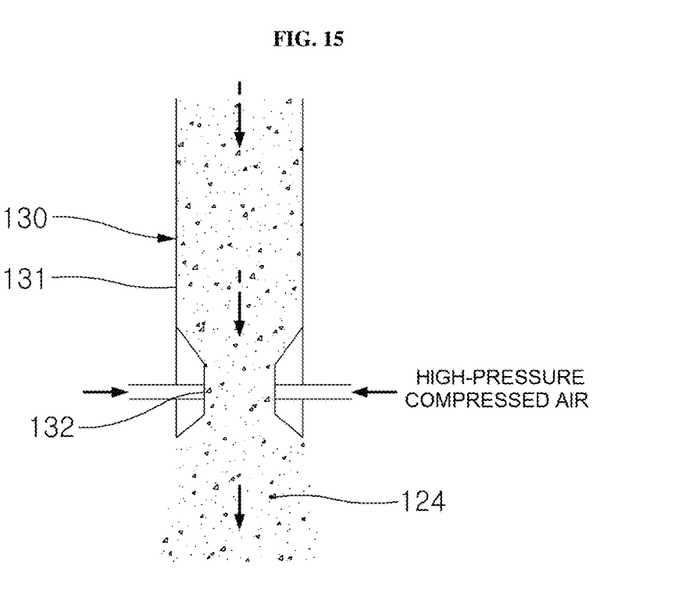

In addition, as shown in FIGS. 15 and 16, when the high-performance concrete 124 is discharged to the outlet of the discharge guide member 131 via the central portion of the discharge guide member 131, a compressed air having a high pressure of 5 atmospheres or above swirls and discharges to the outlet of the discharge guide member 131 through the air supply hole 132 formed with a slope in a radial direction at the outer circumference of the discharge guide member 131. At this time, the compressed air and the high-performance concrete 124 are spread in a spraying manner. When the compressed air and the high-performance concrete 124 are spread in a spraying manner, the compressed air collides with the high-performance concrete 124 to dissipate the large amount of bubbles included in the high-performance concrete 124.

After the bubbles are dissipated, the amount of bubbles remaining in the high-performance concrete 124 is close to the range of air volume included in the normal concrete before being mixed with the bubble slurry 123. In addition, the air volume included in the high-performance concrete 124 is reduced to the range of 3 to 7%, and the slump is also reduced to the range of 40 mm or below, which makes it possible to discharge the high-performance concrete 124 ensuring good workability, high strength and high durability. Table 1 below shows slumps and air volumes of normal concrete before being mixed with bubble slurry, high-performance concrete mixed with bubble slurry and high-performance concrete from which bubbles are dissipated, with respect to concrete having a slump of 0 mm and normal concrete having a slump of 80 mm.

TABLE 1

| Type of normal concrete | State of concrete | Slump (mm) | Air volume (%) |
|---|---|---|---|
| Concrete (slump 0 mm) | normal concrete | 0 | 4.2 |
| | high-performance concrete mixed with bubble slurry | 200 | 26.0 |
| | high-performance concrete from which bubbles are dissipated | 0 | 4.3 |
| Normal concrete (slump 80 mm) | normal concrete | 80 | 6.5 |
| | high-performance concrete mixed with bubble slurry | 270 | 37.0 |
| | high-performance concrete from which bubbles are dissipated | 125 | 4.5 |

Table 2 below shows demanded properties of the two-layer concrete pavement 50.

TABLE 2

| Item | Layer | Reference | Test method |
|---|---|---|---|
| Slump | upper layer | 30 ± 10 mm | KS F 2403 |
| | lower layer | 20 mm or less | |
| Air volume | upper layer | 4 to 7% | KS F 2409 |
| | lower layer | 4 to 7% | |
| Compressive strength (28 days) | upper layer | 40 MPa | KS F 2405 |
| | lower layer | 30 MPa | |
| Bending strength (28 days) | upper layer | 7.0 MPa | KS F 2408 |
| | lower layer | 4.5 MPa | |
| 56-day permeability | upper layer | 1000 Coulomb or less | KS F 2711 |
| Freezing-thawing | upper layer | 80% or above | KS F 2456 |
| Surface detachment resistance | upper layer | 0.1 kg/m$^2$ or below | ASTM C 672 |

Figure 17:
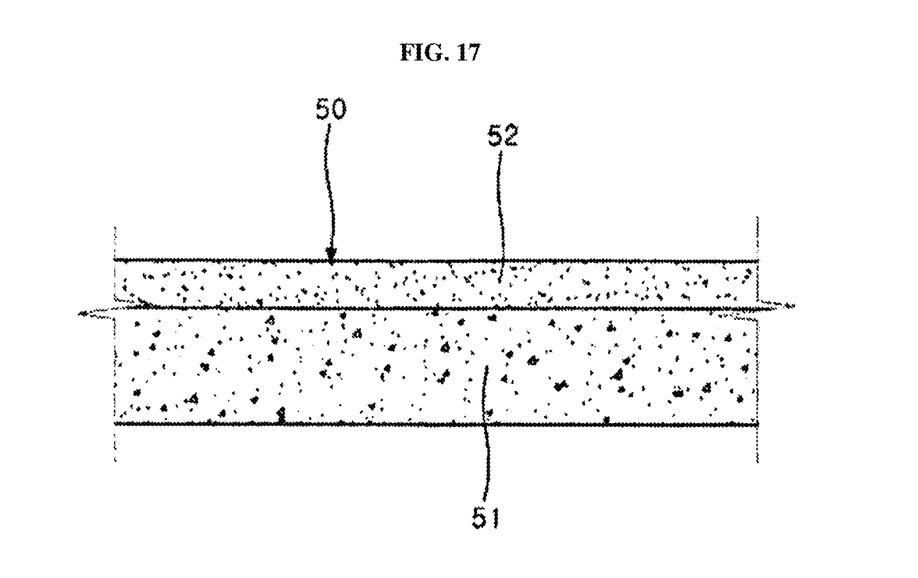
FIG. 17 is a cross-sectional view showing a two-layer concrete pavement according to the present disclosure.

If the high-performance concrete 124 is discharged to the discharge guide member 131 of the high-performance concrete discharging unit 130 and placed on an upper surface of the lower layer 51 of the two-layer concrete pavement 50, as shown in FIG. 17, the high-performance concrete 124 placed on the upper surface of the lower layer 51 is tamped by means of vibrations of the vibrating worktable 140 installed at the slip form paver 110 higher as much as the thickness of the upper layer 52 than the planar worktable 111 of the slip form paver 110 to maintain the upper surface of the upper layer 52 in a horizontal state, and the high-performance concrete 124 is cured to form the two-layer concrete pavement 50.

Figure 18:
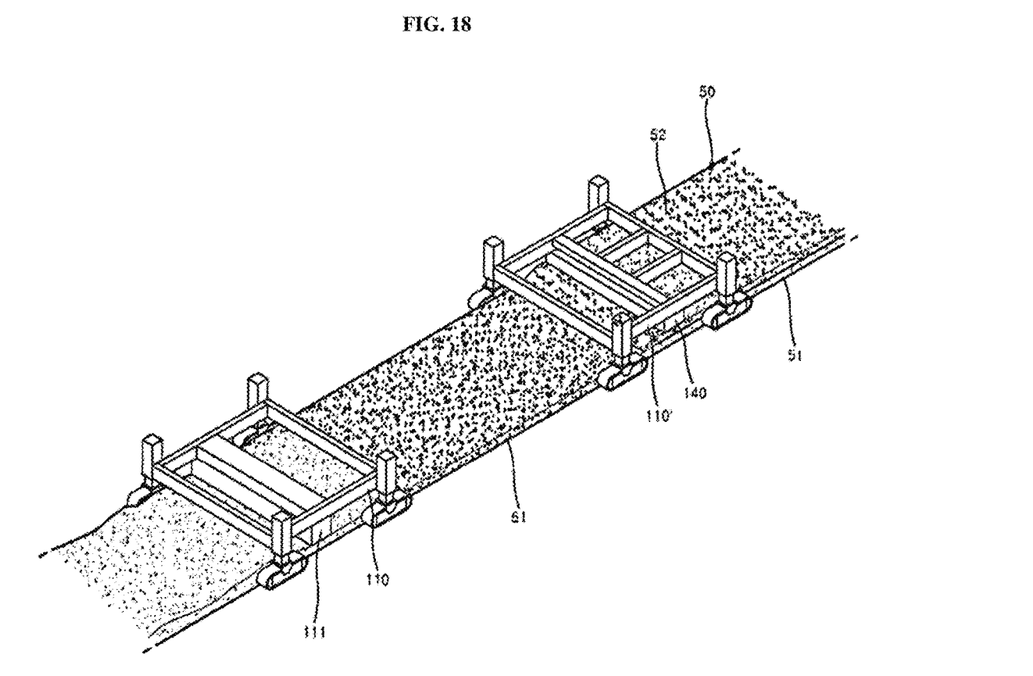
FIGS. 18 and 19 are diagrams showing a construction process according to another embodiment of the present disclosure.
Figure 19:
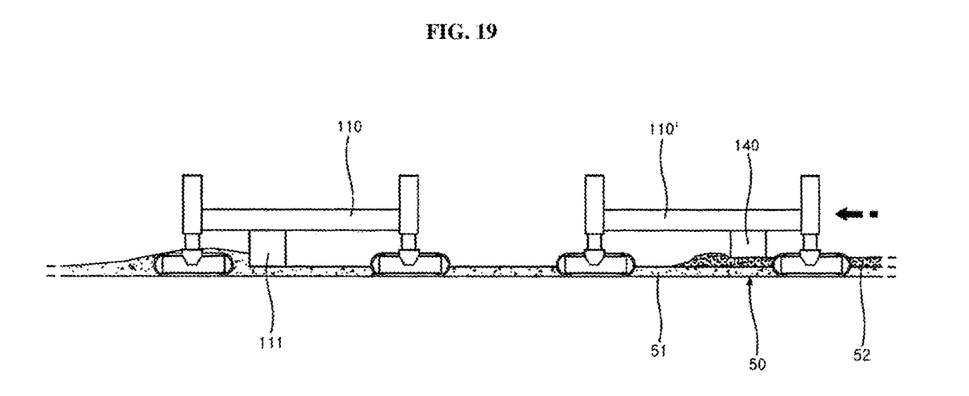

In addition, as shown in FIGS. 18 and 19, when the high-performance concrete 124 is discharged to the upper surface of the lower layer 51 of the two-layer concrete pavement 50, which is formed by the slip form paver 110, to form the upper layer 52 of the two-layer concrete pavement 50, the upper layer 52 of the two-layer concrete pavement 50 is finished using a vibrating worktable 140 installed at a separate slip form paver 110' to keep a horizontal state and is cured to form the two-layer concrete pavement 50.

Here, the upper layer 52 is formed to have a thinner thickness than the lower layer 51 of the high-performance concrete 124 to improve construction ability and keep the high-performance concrete to have high strength and high durability, thereby extending the life span of the two-layer concrete pavement 50 and improving its economic feasibility.

In the present disclosure, the embodiment is just an example, and the present disclosure is not limited thereto. Any feature whose construction and effect are identical to those defined in the claims of the present disclosure should be regarded as falling within the scope of the present disclosure.

In particular, even though the mixed material employs silica fume, metakaolin, fly ash, blast furnace slag fine powder, latex, polymer or the like in the embodiment of the present disclosure, other mixed materials capable of improving properties and economic feasibility of normal concrete may also be applied to the device and method of the present disclosure.

The invention claimed is:

1. A two-layer concrete pavement forming device using normal concrete and high-performance concrete, comprising:
  a usual slip form paver configured to form a lower layer of a two-layer concrete pavement by using a normal concrete with a slump of 40 mm or below;
  a high-performance concrete forming unit provided at one side of the slip form paver to form high-performance concrete by mixing a normal concrete with a slump of 40 mm or below with a bubble slurry in which a mixed material is mixed with bubbles;
  a high-performance concrete discharging unit configured to discharge the high-performance concrete, which is formed by the high-performance concrete forming unit, to an upper surface of the lower layer of the two-layer concrete pavement, while dissipating the bubbles included in the high-performance concrete, to form an upper layer of the two-layer concrete pavement; and a vibrating worktable installed at the slip form paver to tamp and finish an upper surface of the upper layer of the two-layer concrete pavement, wherein the high-performance concrete discharging unit includes:

a discharge guide member configured to receive the high-performance concrete and discharge the high-performance concrete to the upper surface of the lower layer; and an air supply hole formed through the discharge guide member to reduce an air volume by dissipating bubbles included in the high-performance concrete supplied to the discharge guide member so as to supply a high-pressure air of 5 atmospheres or above.

2. The two-layer concrete pavement forming device using normal concrete and high-performance concrete of claim 1, wherein the high-performance concrete forming unit includes:

a hopper configured to supply the normal concrete to a front end of the slip form paver;

a connection member configured to connect the hopper to the high-performance concrete discharging unit and guide movement of the normal concrete supplied to the hopper; and a screw configured to mix the normal concrete with the bubble slurry to form high-performance concrete.

3. The two-layer concrete pavement forming device using normal concrete and high-performance concrete of claim 1, wherein the high-performance concrete forming unit includes:

a shaft configured to rotate by means of a power of a motor in a concrete mixer truck to which the normal concrete is put; and a mixing member formed at the shaft to have at least one stage in a radial direction to mix the normal concrete with the bubble slurry while rotating in a rotation direction of the shaft.

4. The two-layer concrete pavement forming device using normal concrete and high-performance concrete of claim 1, wherein the mixed material is obtained by mixing at least one of silica fume, metakaolin, fly ash, blast furnace slag fine powder, latex, polymer and coloring.

5. The two-layer concrete pavement forming device using normal concrete and high-performance concrete of claim 1, wherein the vibrating worktable is formed integrally with the usual slip form paver or integrally with another slip form paver.

6. A two-layer concrete pavement forming method using normal concrete and high-performance concrete, comprising:

forming a lower layer of a two-layer concrete pavement by pressing a normal concrete with a slump of 40 mm or below using a slip form paver;

forming high-performance concrete by mixing a normal concrete with a slump of 40 mm or below with a bubble slurry in which a mixed material is mixed with bubbles;

discharging the high-performance concrete to an upper surface of the lower layer of the two-layer concrete pavement in a smaller thickness than the lower layer of the two-layer concrete pavement, while dissipating the bubbles included in the high-performance concrete, to form an upper layer of the two-layer concrete pavement; and tamping and finishing an upper surface of the upper layer of the two-layer concrete pavement by using a vibrating worktable, wherein the discharging of the high-performance concrete is performed by:

a discharge guide member configured to receive the high-performance concrete and discharge the high-performance concrete to the upper surface of the lower layer; and an air supply hole formed through the discharge guide member to reduce an air volume by dissipating bubbles included in the high-performance concrete supplied to the discharge guide member so as to supply a high-pressure air of 5 atmospheres or above.

7. The two-layer concrete pavement forming method using normal concrete and high-performance concrete of claim 6, wherein the forming of high-performance concrete is performed by:

a hopper configured to supply the normal concrete to a front end of the slip form paver;

a connection member configured to connect the hopper to the high-performance concrete discharging unit and guide movement of the normal concrete supplied to the hopper; and a screw configured to mix the normal concrete with the bubble slurry to form high-performance concrete.

8. The two-layer concrete pavement forming method using normal concrete and high-performance concrete of claim 6, wherein the forming of high-performance concrete is performed by:

a shaft configured to rotate by means of a power of a motor in a concrete mixer truck to which the normal concrete is put; and a mixing member formed at the shaft to have at least one stage in a radial direction to mix the normal concrete with the bubble slurry while rotating in a rotation direction of the shaft.

9. The two-layer concrete pavement forming method using normal concrete and high-performance concrete of claim 6, wherein the mixed material is obtained by mixing at least one of silica fume, metakaolin, fly ash, blast furnace slag fine powder, latex, polymer and coloring.

10. The two-layer concrete pavement forming method using normal concrete and high-performance concrete of claim 6, wherein the vibrating worktable is formed integrally with the usual slip form paver or integrally with another slip form paver.

* * * * *